(12) United States Patent
Biesheuvel et al.

(10) Patent No.: US 7,318,893 B2
(45) Date of Patent: Jan. 15, 2008

(54) APPARATUS FOR OFFERING AND DISPENSING MINERAL WATER SUITABLE FOR CONSUMPTION

(75) Inventors: Arend Cornelis Jacobus Biesheuvel, Werkendam (NL); Arie Kroon, Bergen (NL); Eric Michael Cornelis Maria van Eijnatten, Obdam (NL)

(73) Assignee: Sara Lee/DE N.V. (NL)

( * ) Notice: Subject to any disclaimer, the term of this patent is extended or adjusted under 35 U.S.C. 154(b) by 399 days.

(21) Appl. No.: 10/867,097

(22) Filed: Jun. 14, 2004

(65) Prior Publication Data

US 2005/0006289 A1 Jan. 13, 2005

(51) Int. Cl.
*C02F 3/12* (2006.01)
(52) U.S. Cl. ..................................... 210/194
(58) Field of Classification Search ............ 210/94–95, 210/194
See application file for complete search history.

(56) References Cited

U.S. PATENT DOCUMENTS

| | | |
|---|---|---|
| 2,297,599 A | 9/1942 | Wilen |
| 3,225,965 A | 12/1965 | Jacobs et al. |
| 3,383,310 A | 5/1968 | Ammer |
| 3,654,148 A | 4/1972 | Bradley |
| 3,856,676 A | 12/1974 | Grimme, Jr. et al. |
| 4,160,727 A | 7/1979 | Harris, Jr. |
| 4,325,975 A | 4/1982 | Lindon et al. |
| 4,528,093 A | 7/1985 | Winer |
| 4,544,084 A | 10/1985 | Cleland |
| 4,597,509 A | 7/1986 | Pereira |
| 4,757,921 A | 7/1988 | Snowball |

(Continued)

FOREIGN PATENT DOCUMENTS

| | | |
|---|---|---|
| DE | 2032863 | 1/1972 |
| DE | 3937510 | 5/1991 |

(Continued)

OTHER PUBLICATIONS

International Search Report, Jun. 2003.

*Primary Examiner*—Chester T. Barry
(74) *Attorney, Agent, or Firm*—Altera Law Group, LLC (57) ABSTRACT

An apparatus for presenting and dispensing mineral water suitable for consumption, characterized in that the apparatus is arranged to generate the mineral water from mains water and is provided with a mains water inlet, water processing means for obtaining the mineral water from the mains water, at least an outlet for dispensing the mineral water and a first fluid connection between the inlet and the water processing means for supplying the mains water to be processed to the water processing means, the water processing means being provided with a first storage vessel which, in use, is filled with the mineral water, at least a second storage vessel which, in use, is filled with minerals, at least a dosing unit for dispensing, in a dosed manner, minerals from the second storage vessel to the first storage vessel, at least a cooling unit for cooling the first storage vessel, at least a third storage vessel which, in use, is also filled with the mineral water, a second fluid connection between the first storage vessel and the third storage vessel for conveying mineral water from the first storage vessel to the third storage vessel and at least a first recirculation system for discharging mineral water from the third storage vessel and for then supplying the discharged mineral water to the third storage vessel again, the outlet being arranged to dispense the mineral water from the third storage vessel and/or the first storage vessel.

35 Claims, 4 Drawing Sheets

U.S. PATENT DOCUMENTS

| | | |
|---|---|---|
| 4,773,993 A | 9/1988 | Yoda et al. |
| 4,784,771 A | 11/1988 | Wathen et al. |
| 4,801,375 A | 1/1989 | Padilla |
| 4,808,346 A * | 2/1989 | Strenger ................ 261/18.1 |
| 4,810,388 A | 3/1989 | Trasen |
| 4,909,931 A | 3/1990 | Bibi |
| 4,915,261 A | 4/1990 | Strenger |
| 4,944,217 A | 7/1990 | Watanabe |
| 4,962,866 A | 10/1990 | Phillips |
| 4,969,991 A | 11/1990 | Valadez |
| 5,004,535 A | 4/1991 | Bosko et al. |
| 5,091,081 A | 2/1992 | Hilgren |
| 5,203,803 A | 4/1993 | Schoenmeyr |
| 5,227,053 A | 7/1993 | Brym |
| 5,261,792 A | 11/1993 | Schoenmeyr |
| 5,427,682 A | 6/1995 | Vogel et al. |
| 5,429,753 A | 7/1995 | Hilgren |
| 5,441,179 A | 8/1995 | Marsh |
| 5,443,739 A | 8/1995 | Vogel et al. |
| 5,494,573 A | 2/1996 | Schoenmeyr et al. |
| 5,569,389 A | 10/1996 | Hilgren |
| 5,575,405 A | 11/1996 | Stratton et al. |
| 5,597,487 A | 1/1997 | Vogel et al. |
| 5,776,339 A | 7/1998 | Ha et al. |
| 5,782,380 A | 7/1998 | DiSanto |
| 6,099,799 A | 8/2000 | Anderson |
| 6,569,329 B1 | 5/2003 | Nohren, Jr. |
| 6,684,648 B2 * | 2/2004 | Faqih ............................ 62/93 |

FOREIGN PATENT DOCUMENTS

| | | |
|---|---|---|
| DE | 9316610 | 3/1994 |
| DE | 19628575 | 1/1998 |
| DE | 199 42 431 | 6/1999 |
| DE | 19825559 | 12/1999 |
| DE | 19829984 | 1/2000 |
| DE | 19839209 | 3/2000 |
| EP | 0246177 | 11/1987 |
| EP | 0138060 | 3/1990 |
| EP | 0115216 | 4/1990 |
| EP | 0255766 | 9/1992 |
| EP | 0634109 | 6/1994 |
| EP | 0492370 | 7/1994 |
| EP | 0651358 | 5/1995 |
| EP | 0576752 | 1/1997 |
| EP | 0947518 | 10/1999 |
| EP | 1129986 | 9/2001 |
| EP | 0928565 | 9/2003 |
| EP | 1161886 | 11/2005 |
| GB | 202839 | 8/1923 |
| GB | 2015863 | 9/1979 |
| GB | 2069458 | 8/1981 |
| GB | 2148117 | 5/1985 |
| HU | 188438 | 2/1988 |
| JP | 3224690 | 10/1991 |
| JP | 11283120 | 10/1999 |
| JP | 1258793 | 2/2000 |
| JP | 2002282870 | 10/2002 |
| JP | 2002292371 | 10/2002 |
| JP | 2003030740 | 1/2003 |
| JP | 8077454 | 3/2005 |
| KR | 20020003719 | 1/2002 |
| KR | 2002024125 | 3/2002 |
| NL | 7901469 | 2/1979 |
| RU | 2192765 | 11/2002 |
| WO | WO 90/05348 | 5/1990 |
| WO | WO 91/12734 | 9/1991 |
| WO | WO 92/04969 | 4/1992 |
| WO | WO 94/06547 | 3/1994 |
| WO | WO 94/12189 | 6/1994 |
| WO | WO 95/28854 | 11/1995 |
| WO | WO 96/29890 | 10/1996 |
| WO | WO 98/39085 | 9/1998 |
| WO | WO 98/48648 | 11/1998 |
| WO | WO 99/33363 | 7/1999 |
| WO | WO 99/42002 | 8/1999 |
| WO | WO 99/61366 | 12/1999 |
| WO | WO 00/12200 | 3/2000 |
| WO | WO 00/47064 | 8/2000 |
| WO | WO 01/22838 | 4/2001 |
| WO | WO 03/029150 | 4/2003 |

* cited by examiner

APPARATUS FOR OFFERING AND DISPENSING MINERAL WATER SUITABLE FOR CONSUMPTION

The invention relates to an apparatus for presenting and dispensing water suitable for consumption. Mineral water is understood herein to mean water, such as purified water, distilled water or mains water or even unpurified water, and the like, to which minerals have been added.

The known apparatus is provided with a transparent storage vessel which is filled with the mineral water. The storage vessel concerns a refilling package placed outside a housing of the apparatus. The storage vessel is connected with an outlet by means of a fluid connection, the respective fluid connection including a valve for opening and closing the fluid connection. The apparatus is further provided with a manually operable valve for dispensing portions of mineral water in, for instance, a holder, such as a glass or a beaker. A disadvantage of the known apparatus is that the storage vessel must be replaced by a new storage vessel when it is empty. It is difficult to place the new storage vessel because it is relatively heavy. Because it is further important that the storage vessel is not emptied too fast the storage vessel also has a relatively large volume. This implies that when, for whatever reasons, relatively little mineral water is taken from the apparatus, this water may age so that no fresh mineral water is dispensed. Furthermore, the known apparatus has the disadvantage that condensation occurs in the storage vessel, and that on the upper side of the vessel, water droplets are formed which promote microbes and/or algal growth. Besides, the condensation droplets do not project an image of freshness to the customers.

It is an object of the invention to provide at least a solution to at least a number of the mentioned problems. The apparatus according to the invention is correspondingly characterized in that the apparatus is arranged to generate the mineral water from mains water and is provided with a mains water inlet, a fast storage vessel which, in use, is filled with the mineral water, at least a first fluid connection between the inlet and the first storage vessel and, optionally, a filter which is included in the first fluid connection for filtering mains water which, in use, flows from the inlet via the first fluid connection to the first storage vessel, at least a second storage vessel which, in use, is filled with minerals, at least a dosing unit for dispensing, in a dosed manner, minerals from the second storage vessel to the first storage vessel, at least a cooling unit for cooling the first storage vessel, at least a third storage vessel which, in use, is also filled with the mineral water, a second fluid connection between the first storage vessel and the third storage vessel for conveying mineral water from the first storage vessel to the third storage vessel and at least an inlet for dispensing mineral water from the third storage vessel and/or the first storage vessel, the apparatus further being provided with at least a first recirculation system for discharging mineral water from the third storage vessel and for then supplying the discharged mineral water to the third storage vessel again.

Because the apparatus is arranged to generate mineral water from means water, no storage vessels need to be replaced. Moreover, if desired, the volumes of the first and the third storage vessel can be kept relatively small so that even when relatively small amount of mineral water is taken, the mineral water in the respective storage vessels is relatively often refreshed. In that case, the problem of aged water need not occur or will occur to a relatively lesser extent.

In particular, it holds that the first fluid connection comprises a conduit which tends from the inlet to the first storage vessel. In such an embodiment, the mains water flows directly to the first storage vessel to be provided with minerals. Instead thereof, it may hold that the first fluid connection is provided with a conduit which extends from the inlet to the first recirculation system and a conduit which extends from the first recirculation system to the first storage vessel. In such an embodiment, a concentrate of minerals may be supplied to the intermixing mains water and mineral water in the first recirculation system. This is particularly an advantage if relatively much water is taken by a user (users) within a short time.

In particular it holds that a wall of the third storage vessel is of at least partly transparent design. This gives the possibility that mineral water can be seen from an outside of the storage vessel In particular it holds that a first recirculation system is provided with a recirculation inlet from where, in use, the mineral water squirts against an inner side of the wall of the third storage vessel. Because the water in the storage vessel is in movement and is, moreover, regularly filtered when a filter is included in the recirculation system, algal formation is prevented. Besides, condensation and droplet formation on the upper side of the storage vessel is prevented. This is particularly important if the third storage vessel is of at least party transparent design so that algae could be formed under the influence of light.

In particular it holds that the apparatus is provided with a housing in which the first storage vessel, the second storage vessel the cooling unit, and the dosing unit are included, at least a part of the transparent part of the wall of the third storage vessel being situated outside the housing. This has the advantage that the part of the apparatus which is attractive to see for the consumer, namely the third storage vessel, is visible while the other component parts that are less attractive for the consumer can be concealed within the housing so as to be invisible. The recirculating water in the third storage vessel has a stimulating effect on the consumer so that he may decide to take a portion of mineral water.

In particular it further holds that, in use, the mineral water from the recirculation outlet squirts against a transparent part of the wall of the third storage vessel. Exactly the transparent part is sensitive to algal formation and growth of microorganisms and to condensation. This is very effectively prevented by this measure. Furthermore, it is attractive for a consumer to see how the water squirts against the transparent part of the wall of the third storage vessel.

In particular it holds that an upper side of the third storage vessel is of spherical design, the transparent part of the inner wall comprising at least a part of the spherical part. Preferably, it holds that the mineral water squirts from the recirculation outlet upward in very direction. According to a preferred embodiment, it further holds that the wall of the whole third storage vessel is of transparent design and that the whole storage vessel is placed out the housing. The consumer can then see the whole storage vessel, which is felt to be commercially attractive.

In particular, it further holds that the apparatus is further provided with a third fluid connection between the first storage vessel and a first outlet of the at least one outlet for dispensing cooled mineral water from the first storage vessel. In this manner, the consumer can choose to take, for instance, uncooled mineral water from the third storage vessel or cooled mineral water from the cooled first storage vessel.

In particular, it further holds that a second outlet of the at least one outlet is connected with third storage vessel for dispensing mineral water from the third storage vessel, the first and the second outlet preferably being placed near each other such that from both outlets water can be supplied to a container such as a beaker or cup without displacing the container. As a result, a cup can be placed in one and the same position for taking cooled or uncooled mineral water.

Furthermore, it preferably holds that the first and the second outlet are placed below the third storage vessel so that a user obtains the impression that water flowing out of the first outlet comes from the third storage vessel. The consumption of cooled water which the consumer thinks comes from the third storage vessel that can give the attractive image of the recirculating water will further add to the pleasure of drinking mineral water.

The invention will now be explained in more detail with reference to the drawing. In this drawing.

Figure 1:
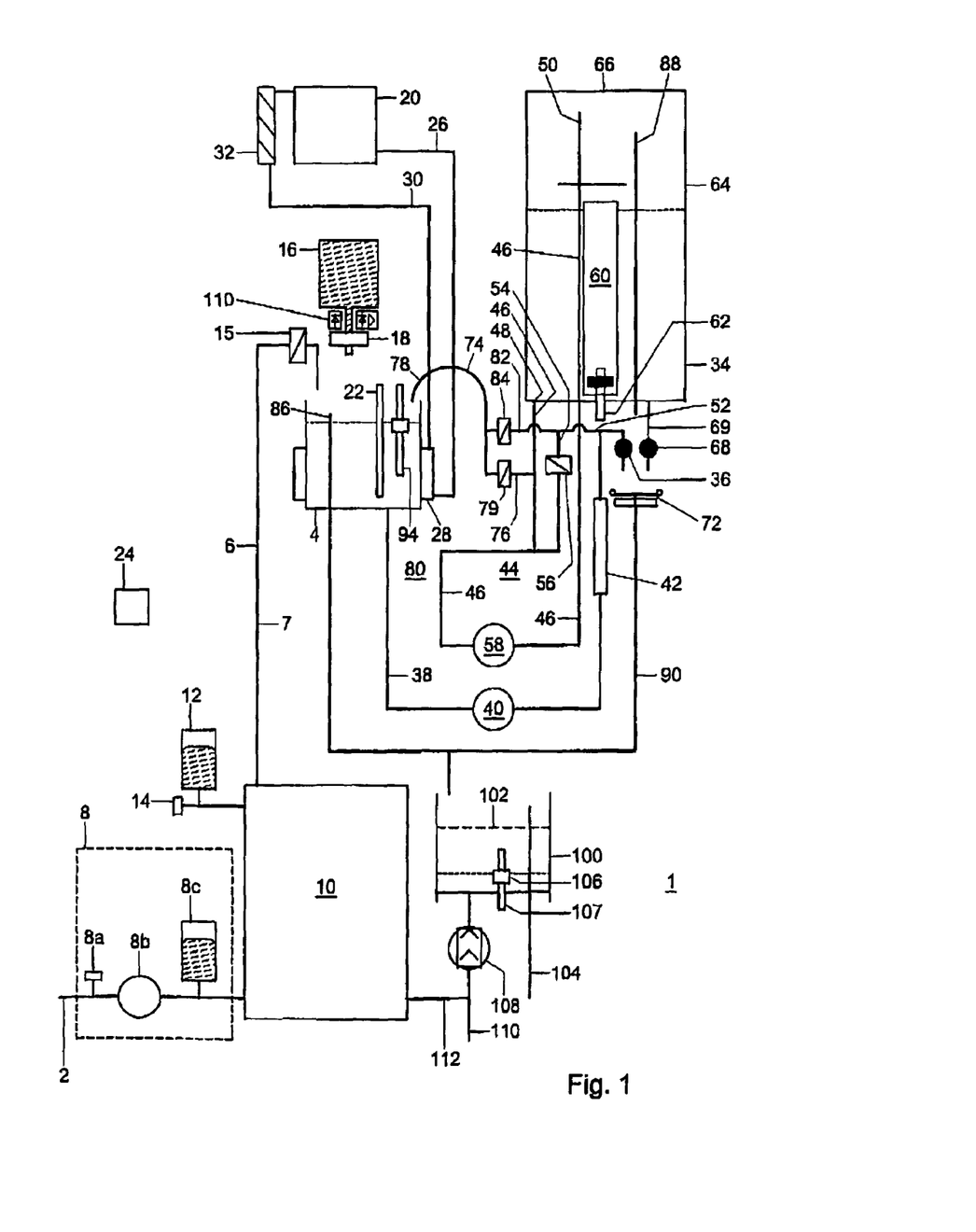
FIG. 1 diagrammatically shows a first possible embodiment of an apparatus according to the invention.

In FIG. 1 reference numeral 1 denotes a first possible embodiment of the apparatus for presenting mineral water suitable for consumption. The apparatus is provided with a mains water inlet 2 which, in use, can be connected with an open tap. The apparatus is further provided with a first storage vessel 4 which in use, is filled with mineral water. Furthermore, the apparatus is provided with a first fluid connection 6 between the inlet 2 and the first storage vessel 4. The first fluid connection 6 comprises a conduit 7 which extends from the inlet 2 to the first storage vessel 4. The fluid connection 6 optionally includes a pressure regulating unit 8 and a filter 10. If the mains water pre-pressure is high enough, the pressure regulating unit is not necessary. An inlet of the pressure regulating unit 8 is connected with the mains water inlet 2. Furthermore, an outlet of the pressure regulating unit 8 is connected with an inlet of the filter 10. The pressure regulating unit 8 is, for instance, provided with a pressure switch 8a, a pump 8b, and an expansion vessel 8c. When the pressure witch 8a is on, the pump 8b generates a pressure of 25 Psi ($\approx$172 kPa=172.10$^3$ kg/(m·s$^2$)). When the pressure switch 8a is off, this pump generates a pressure of 35 Psi ($\approx$241 kPa=241.10$^3$ kg/(m·s$^2$)).

Furthermore, the filter 10 is optionally connected with an expansion vessel 12 and a pressure switch 14.

The filter 10 is arranged to filter mains water which flows from the mains water inlet 2 via the fluid connection 6 to the first storage vessel 4. The fluid connection 6 further includes a valve 16 for opening and releasing the fluid connection 6.

The apparatus is further provided with a second storage vessel 16 which in use, is filled with minerals. The storage vessel 16 may then, for instance, be filled with a viscous mineral concentrate or with numerals in powder (day) form. The apparatus further comprises a dosing unit is for dispensing, in a dosed manner, orals from the second storage vessel 16 to the first storage vessel 4. The dosing unit 18 may, for instance, be designed as described in Netherlands patent application 1012395.

The apparatus is further provided with a cooling unit 20 for cooling the first storage vessel 4. The first storage vessel 4 includes a temperature sensor 22 which measures the temperature of the mineral water contained in the storage vessel 4. The measured temperature is transmitted to a control unit 24. The control unit 24 then controls, on the basis of the measured temperature, the cooling unit so that it regulates the mineral water contained in the fist storage vessel 4 to a predetermined cooled temperature. In general, this temperature will be lower than room temperature, for instance 4-16 degrees. To this end, the cooling unit 20 allows a cooling liquid to flow via a conduit 26 to a heat exchanger 28, which heat exchanger is connected with the first storage vessel 4. The cooling liquid flows through the heat exchanger 28 for cooling the mineral water contained in the first storage vessel 4. The cooling liquid is then returned via a conduit 80 to the cooling unit 20. The apparatus is further provided with a ventilator 32 or a static cooler, such as a peltier element, for cooling the cooling liquid in the conduit 30 and for cooling the cooling unit 20. In particular, the second storage vessel 16 may also be cooled by means of the cooling unit 20 or by means of another cooling unit (not shown).

The apparatus is further provided with a third storage vessel 34 which, in use, is likewise filled with mineral water. The apparatus is provided with a manually operable first outlet 36 which is connected with the first storage vessel 4 via a conduit 88. The conduit 38 includes a pump 40 and a filter 42, in particular a membrane filter for removing uses or bacteria. The apparatus is further provided with a first recirculation system 44 for discharging mineral water from the third storage vessel and for then supplying discharging mineral water to the third storage vessel again. To this end, the recirculation system 44 comprises a conduit system 46 of which an inlet 48 is situated at a bottom of the third storage vessel 84 and of which a recirculation outlet 60 is situated near an upper end of the third storage vessel 34. The conduit 88 is connected, downstream of the membrane filter 42, with the conduit system 46 by mm of a conduit 62 and a conduit 54 via a valve 56. When the outlet 86 is closed and the valve 56 is open, the conduits 38, 52, 54 and a part of the conduit system 46 thus form a second fluid connection between the first storage vessel and the third storage vessel for conveying mineral water from the first storage vessel to the third storage vessel. It therefore holds that the second fluid connection at least partly extends through at least a part of the first recirculation system. This mineral water is then pumped by the pump 40 from the first storage vessel 4 to the recirculation system 44. The conduit system 46 of the recirculation system includes a pump 58 which then pumps the mineral water further so that it is pumped via the recirculation outlet 50 into the third storage vessel 34. The third storage vessel 34 is further provided with a float 60 which energizes a switch 62 when the level of the mineral water in the third storage vessel 34 exceeds a predetermined value. Preferably, the float can move the switch to a high position at a high water level, to a middle position at a desired level of the water, and to a low position at a low level of the water.

Figure 2:
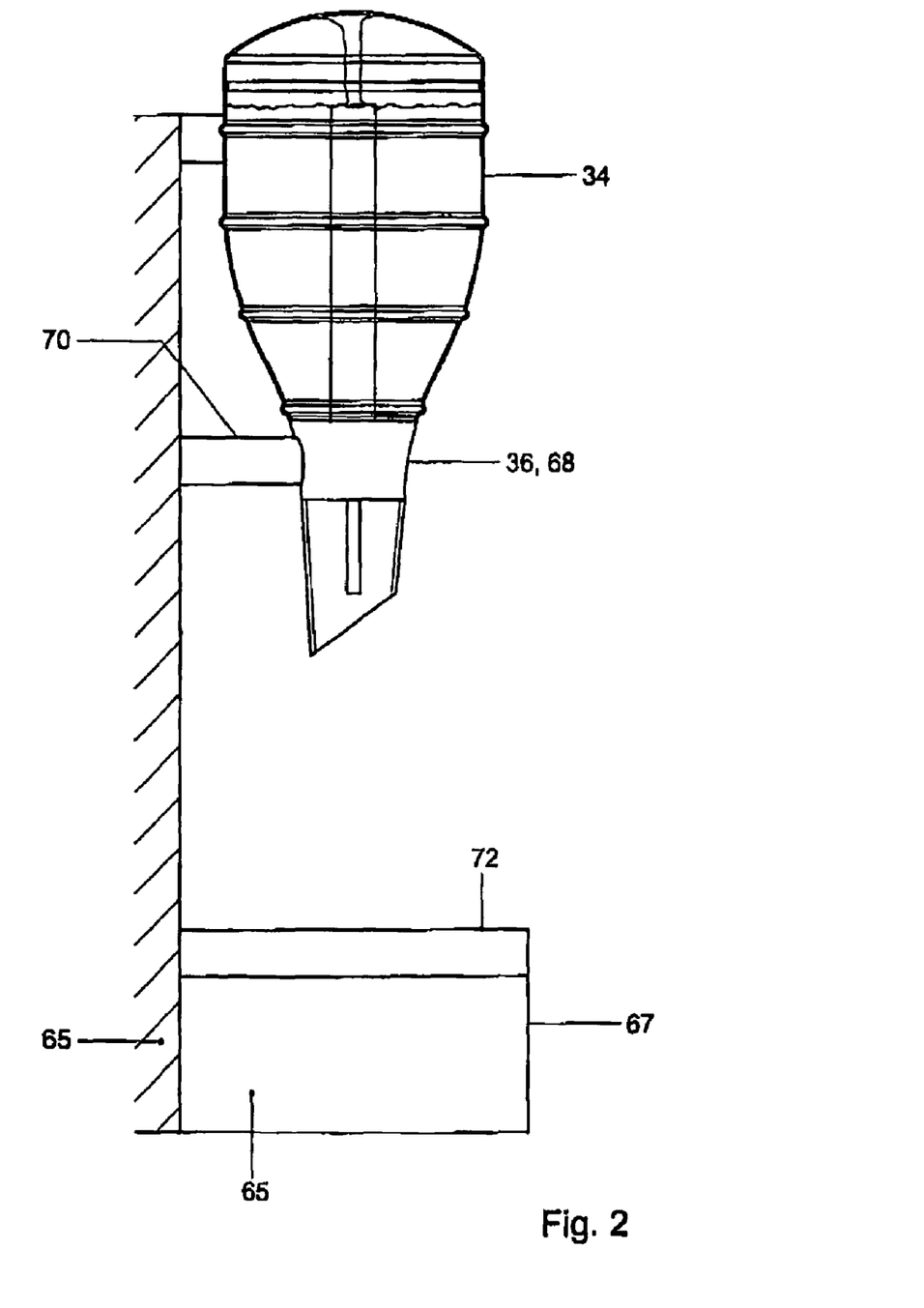
FIG. 2 is a view of a possible embodiment of an apparatus according to the invention.

A wall 64 of the storage vessel is of at least partly transparent design. When the valve 56 is closed and the pump 58 is in operation, the water will be recirculated by means of the recirculation system 44 while this water squirts from the recirculation outlet 50 against an inner side 66 of the wall: 64 of the third storage vessel. In this example, the mineral water squirts from the recirculation outlet 50 against the transparent part of the wall 64 of the third storage vessel 34. As shown in FIG. 2, it holds in this example that the apparatus is further provided with a housing 65 in which all the mentioned component parts are included with the exception of the third storage vessel 84 and the outlet 36. The first storage vessel 4, the second storage vessel 16, the pressure regulation unit 8, and the filter 10, the filter 42, the pump 58, etch are therefore included in the housing 65 and shielded from vision. In this example, it further holds that the third storage vessel 34 (see FIG. 3) is of spherical design on its upper side, the transparent part of the wall 64 comprising at least a part of the spherical part. In this example, it holds that the whole storage vessel 34 is of transparent design and is situated completely outside the housing. In this example, the conduit 38 forms a third fluid connection between the first storage vessel and the first outlet 36 for dispensing cooled moral water from the first storage vessel. The apparatus is further provided with a second outlet 68 for dispensing mineral water from the third storage vessel 34 via a conduit 69 forming a fourth fluid connection. In this example, the first outlet 36 and the second outlet 68 are placed near eat other, such that from both outlets mineral water can be supplied to a container, such as a beaker or cup, without requiring displacement of the container.

As shown in FIG. 2, the first and the second outlet 36, 68 are placed below the third storage vessel 34 so that the user obtains the impression that the water flowing out of the first outlet 36 comes from the third storage vessel 34.

The third storage vessel 34 hangs, by means of a support 70 and an upright wall 71, above a platform 72 of the housing 67. The third fluid connection which connects the first storage vessel 4 with the first outlet 36 extends through the support 70. Thus, this is invisible to the user. This likewise applies to conduits 48 and 52, that is to say to the first recirculation system and the second fluid connection. Furthermore, the third fluid connection and the conduits 46, 52 extend further behind or through the upright wall 71 to the housing 67.

The apparatus is further provided with a fifth fluid connection between the third storage vessel 34 and the first storage vessel 4 for conveying mineral water from the third storage vessel back to the first storage vessel. This fifth fluid connection comprises, in this example, a conduit 74 of which an inlet 76 is connected with the recirculation system 44 and of which an outlet 78 discharges into the first storage vessel and a part of the conduit system 46. The conduit 74 further includes a valve 79. In fact, the conduit 74 forms a sixth fluid connection which extends from the first recirculation system 44 to the first storage vessel 4. By opening the valve 79, internal water can be returned from the third storage vessel 34 to the first storage vessel 4. The fifth fluid connection is therefore also shielded from vision, as described for the third fluid connection. The apparatus is further provided with at least a second recirculation system 80 for discharging mineral water from the first storage vessel and for then returning the discharged mineral water to the first storage vessel again. This second recirculation system is formed, in this example, by the conduit 38, the conduit 52, and a conduit 82 which connects the conduit 52 and the conduit 74 with each other. It therefore holds that the second fluid connection extends through at least a part of the second recirculation system. The line 82 includes a valve 84. When the valve 84 is open, the water is recirculated via the mentioned conduits, that is to say that, by means of the line 38, it flaws out of the first storage vessel 4 and is supplied to the first storage vessel 4 again via the conduits 62, 82, and 74. The recirculation system 80 comprises the filter 42 to prevent microbial and/or algal growth (lower plants) in the mineral water supplies. Microbial is then protozoa, bacteria or viruses.

Filter 42 is now in the recirculation system 80, but could also be in the recirculation system 44 or parallel to conduit 46, a part being filtered continuously. This results in different methods for cleaning the water. Either periodically over recirculation system 80 or continuously over recirculation system 44.

The first storage vessel 4 is further provided with an overflow 86 for discharging mineral water from the first vessel when the level of the mineral water in the first storage vessel exceeds a first predetermined value. Furthermore, the third storage vessel is provided with an overflow 88 for discharging mineral water from the third storage vessel when the level of the mineral water in the third storage vessel exceeds a second predetermined value. The second overflow discharges into the platform 72. The platform 72 is connected with a discharge channel 90 for discharging (for instance split) mineral water from the platform. Also, mineral water flowing out of the third storage vessel 34 because the mineral water level exceeds the second predetermined value is thus discharged via the platform 72 via the conduit 90.

The control device 24 controls each of the mentioned valves and pumps as well as the cooling unit 20.

In this example, it therefore holds that each fluid connection that extends from the housing 67 to the third storage vessel 34 or the first outlet 36 is shielded from vision and that the first storage vessel, the second storage vessel, the cooing unit, and the dosing unit are shielded from vision.

The hitherto described apparatus operates as follows.

Mains water is supplied to the filter via the possible pressure unit 8. The filter 10 is, for instance, arranged to filter from the mains water sediment, dirt, rust, aromatic substances and flavorings, minerals and/or salts and/or microorganisms. The filter may also comprise a reverse osmosis membrane, an ion exchange and/or a distillation device. This filter may likewise comprise a carbon filter. As a result, organic and organic ingredients or components are removed.

The thus filtered water is supplied via the first fluid connection 6 to the first storage vessel 4 when the valve 15 is open. As a result, the water level in the first storage vessel will rise. The first storage vessel further comprises a float 94 with a switch that indicates when a desired level in the first storage vessel 4 has been reached. The switches communicate with the control unit 24 which, subsequently or simultaneously in the proper ratio, closes the valve 15 and switches the pump 8b off. Then the control device 24 controls the dosing device 18 for adding minerals to the filtered water. Thus, mineral water is formed in the vessel 4. To properly mix the minerals with the mineral water, the control device 24 ensures that the mineral water is recirculated in the fist storage vessel 4 via the second recirculation system 80. To this end, the valves 56 and 79 will be closed, and the valve 84 is open. Furthermore, the pump 40 will be in operation. Of course, the mixing of water with the minerals may likewise be carried out by means of a stirrer which is included in the first storage vessel 4. A static mixer may also be used. Such a variant falls within the scope of the invention. It is also conceivable that no recirculation or stirring occurs. The control unit 24 may further ensure that the third storage vessel 34 is filled with mineral water from the first storage vessel. To this end, the valves 78 and 84 are closed, and the valve 56 is opened. Thus, mineral water from the first storage vessel 4 is supplied to the recirculation system 44. This mineral water is then squirted by the pump 68 into the third storage vessel 34. When float 60 indicates that the storage vessel is filled until the desired predetermined value, the float 60 operates the switch 62 which communicates with the control unit 24. The control unit 24 then stops the supply of mineral water from the first storage vessel to the third storage vessel. If the third storage vessel is much larger than the first storage vessel the first storage vessel may, when the first storage vessel is empty, be filed with mineral water which is prepared on the basis of mains water and the minerals stored in the second storage vessel, as discussed above. With this, the third storage vessel 34 can be filled further from the first storage vessel 4. This process may, if desired, be repeated a number of time until the third storage vessel 34 is filled.

Figure 3:
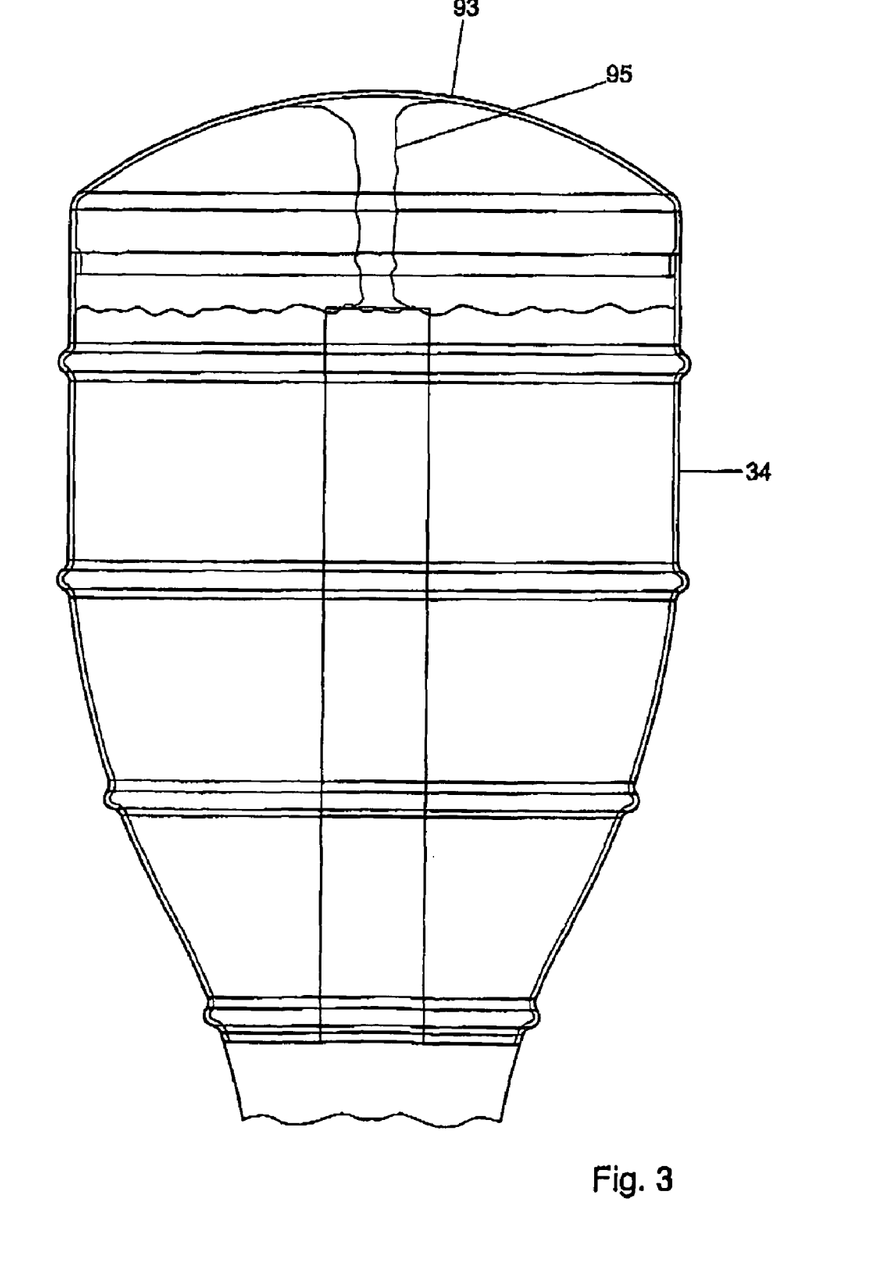
FIG. 3 shows, in detail the third storage vessel of the apparatus of FIG. 2.

When the third storage vessel 34 is filled, the control unit 24 ensures that the recirculation device 44 is active. As a result, via conduit 46 mineral water is pumped out of the third storage vessel and then pumped back via the recirculation outlet 50. The water squirts against the inner side 66 of the third storage vessel. In this examples, the mineral water squirts from the recirculation outlet 50 vertically upward against a spherical upper side 93 of the third storage vessel 34 (see FIG. 3). FIG. 3 shows that the whole third storage vessel 34 is of transparent design. The vertical mineral water jet from the recirculation outlet 50 is denoted by reference numeral 95. Periodically, the second recirculation device 80 is put into operation. The cold water contained in the conduits 38, pump 40, and filter 42 will gradually warm up. To keep the water in conduit 38 cool, valve 84 is gradually opened while valves 56 and 87 remain closed so that the warmed-up water contained in conduit 38 is returned to vessel 4 and replaced by cold water from vessel 4. Simultaneously, the water is filtered over filter 42 to remove undesirable constituents in the water, such as algae, microbes or aromatic substances or flavorings. The filter may therefore be provided with a microfilter, such as a capillary membrane or a ceramic filter or a carbon filter.

When a user opens the first outlet 36, a cup placed on the platform 72 is filled with cooled mineral water coming from the first storage vessel. As a result, the level of the water in the first storage vessel will sink, which is detected by means of the float 94, after which the first storage vessel can be refilled again with mains water and minerals, as discussed above. The user, for that matter, obtains the impression that he takes water coming from the third storage vessel 84.

If, however, a user wishes to consume uncooled mineral water, he can open the second outlet 68 for supplying uncooled mineral water from the third storage vessel to a holder situated on the platform 72. By means of switch 62, it is detected that the storage vessel is not completely filled until the predetermined first level. The control unit 24 can then ensure that the third storage vessel is refilled from the first storage vessel. It is also possible, however, that the third storage vessel is refilled only if the mineral water level has sunk to below a predetermined second level which is lower than the first level. To this end, the third storage vessel may be provided with a second float/switch combination. The water level is then always situated between the first and the second predetermined level Correspondingly, the first storage vessel may be provided with a second float/switch combination so that the water level in the first storage vessel is also refilled until a third predetermined level when the levels sinks until a fourth predetermined level which is lower than the third predetermined level. Periodically, the contents of vessel 34 may be cooled and cleaned by recirculating a part of the contents of vessel 34 via valve 78 to vessel 4. Via the recirculation system 80, conduit 54 and conduit 58, cold water from vessel 4 is then returned again via filter 42 to vessel 34. This has the advantage that, periodically, the water in vessel 34 is cleaned from microbial contaminations or algae that may be present.

When it is desired to empty the third storage vessel 34, the valve 79 can be opened. The mineral water flows from the third storage vessel to the first storage vessel. Optionally, an excess of mineral water may be discharged from the fast storage vessel via the overflow 86.

In this example, the apparatus is further provided with a waste water tank 100 in which mineral water that flows out of the first storage vessel via the overflow 86 is collected.

Furthermore, water flowing away from the platform 72 via the conduit 90 is collected in this storage tank 100. The storage tank is further provided with a dirt filter 102 and an overflow 104 for discharging waste water when the level of the waste water in the storage tank 100 exceeds a predetermined value. Furthermore, the waste tank 100 includes a float 106 which operates a switch 107. The switch 107 energizes a pump 108 for discharging waste water from the tank 100 when the float rises above a predetermined value. This waste water is supplied under pressure to a conduit 100 which discharges, for instance, in the sewer. The conduit 110 likewise communicates via a conduit piece 112 with the filter 10 for discharging waste materials from the filter 10 to the sewer.

Figure 4:
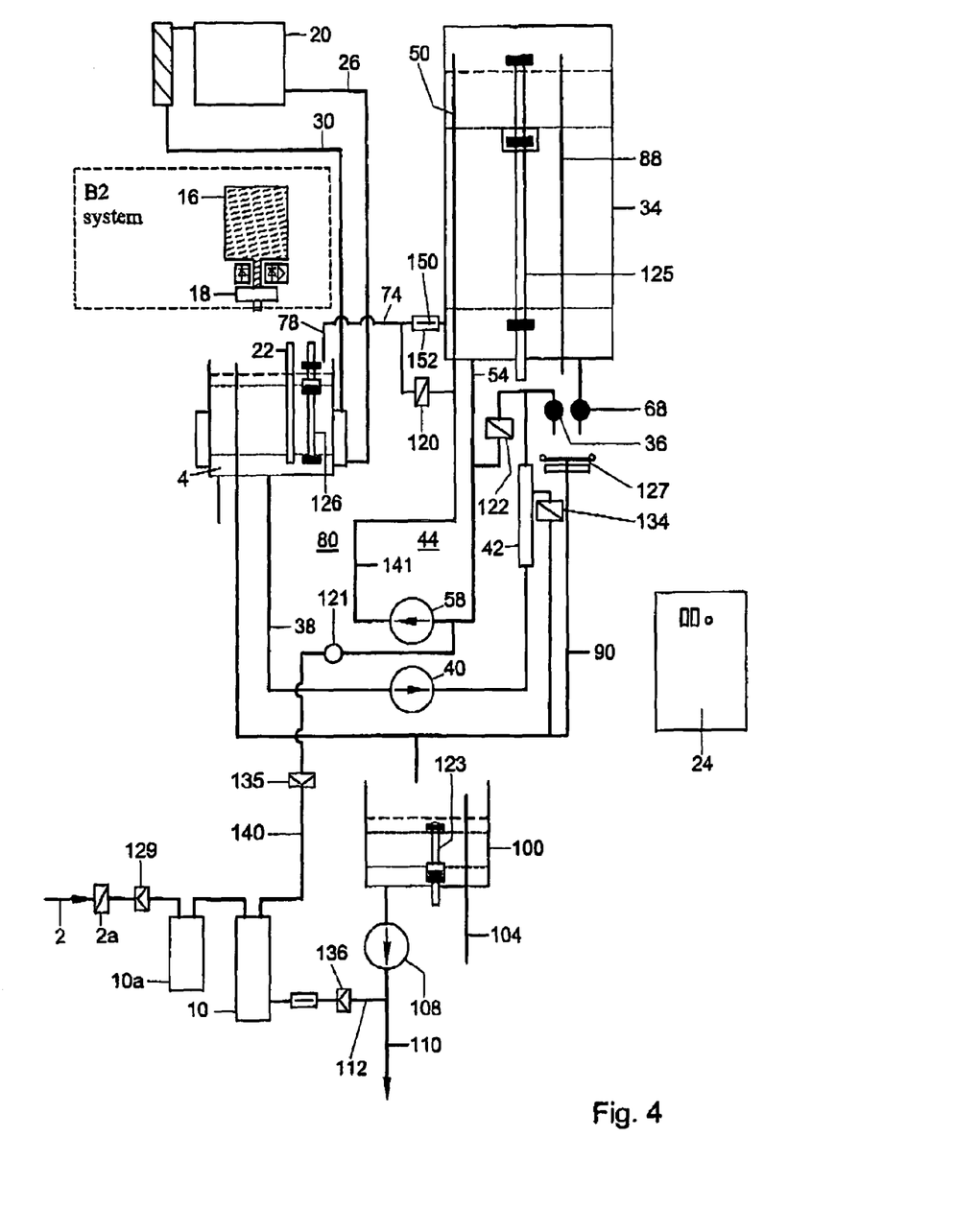
FIG. 4 diagrammatically shows a second possible embodiment of an apparatus according to the invention.

FIG. 4 diagrammatically shows a second possible embodiment of an apparatus according to the invention. In FIGS. 1 and 4, parts corresponding with each other are provided with the same reference numerals.

In the second embodiment, it holds that the first fluid connection 6 is provided with a conduit 140 which extends from the inlet 2 to the first recirculation system 44 and a conduit 74 which extends from the first recirculation system 44 to the first storage vessel 4. The first fluid connection also comprises a part of the first recirculation system 44 (which is situated between the points of connection of the conduit 140 with the first recirculation system 44 and the conduit 74 with the first recirculation system 44).

When staring up the apparatus, the mains water flows via the conduit 140, a part of the first recirculation system 44, and the conduit 74, when a valve 120 is open, from the mains water inlet 2 to the first storage vessel 4. This means that the first fluid connection extends from the inlet 2 to the first storage vessel 4. Therefore, the first fluid connection included between the mains water inlet 2 and the first storage vessel 4 is, in this case, formed by the conduit 140, a part of a conduit 141 of the first recirculation system 44, the conduit 74, and the outlet 78. Arranged in the conduit 140 is a filter 10 in a downstream position of the mains water inlet 2. This filter preferably comprises a Reverse Osmosis (RO) filter. Furthermore, a non-return valve 129 is included between the mains water inlet 2 and the RO filter 10. Arranged between the mains water inlet 2 and the non-return valve 129 is the tap 2a. Preferably, a dirts water filter 10a is included between the RO filter 10 and the non-return valve 129. The conduit 141 connects to the conduit 74 which discharges by means of an outlet 78 into the first storage vessel 4. The conduit 140 further includes a flow meter or volume meter 121. The conduit 74 comprises a tap or valve 120. The first storage vessel 4 contains a float with a switch 126. The float 126 with the switch is provided with three positions, that is to say; a lower position at a low level of the water in the first storage vessel 4; a higher position at a high level of the water in the first storage vessel 4; and a middle position which applies when the water assumes a level between the highest and the lowest level.

The switch 126 communicates with the control unit 24. When the switch 126 assumes the lower position, the control unit 24 ensures that the valve 120 is open. This takes place when staring up the apparatus when the apparatus is filled with mains water. The mains water is, in that case, supplied via the first fluid connection to the first storage vessel 4, at least until the switch 126 assumes a position between the lower and the higher position.

In this embodiment, the flow or volume meter 121 communicates with the control unit 24. On the basis of a predetermined amount of water measured by the meter 21, the control unit ensures that the dosing unit 18 dispenses minerals from the second storage vessel 16 to the first storage vessel 4. Thin embodiment, too, is provided with a cooling unit 20 for cooling the first storage vessel 4. Furthermore, this embodiment, too, is provided with a third storage vessel which, in use, is filled with mineral water. The apparatus is further provided with a second recirculation system 80 for discharging mineral water from the first storage vessel 4 and for then supplying the discharged mineral water to the first storage vessel 4 again.

This apparatus is further provided with a second fluid connection between the first storage vessel 4 and the third storage vessel 34 for conveying the mineral water from the first storage vessel 4 to the third storage vessel 34. The second fluid connection comprises the conduit 38, a part of the conduit 54, and a part of the conduit 141. The second fluid connection is, in this embodiment, therefore formed by a part of the second recirculation system 80, a part of the first recirculation system 44, and the recirculation outlet 50. The second fluid connection therefore extends at least patty through at least a part of the first recirculation system. The second recirculation system 80 includes the conduit 38 which is connected with the first storage vessel 4. The conduit 38 further includes a pump 40 and a filter 42. From the conduit 38, the water can arrive via valve 122 in the first recirculation system 44 from where the mineral water can flow to the recirculation outlet 50 to thus arrive in the third storage vessel 34. In other words, the second recirculation system comprises the conduit 38, a part of the conduit 141, the conduit 54, and the conduit 74. The second recirculation system 80 therefore comprises a part of the first recirculation system 44. It therefore also holds that the second fluid connection extends through at least a part of the second recirculation system. The apparatus also comprises an outlet for dispensing mineral water from a third storage vessel 34 and/or the first storage vessel 4.

In the embodiment shown in FIG. 4, outlet 36 forms the outlet for dispensing mineral water from the first storage vessel, and outlet 68 forms the outlet for dispensing mineral water from the third storage vessel 34. The first recirculation system 44 is also suitable for discharging mineral water from the third storage vessel 34 and for adding, via conduit 74 when a valve 120 is open, the discharged mineral water to the third storage vessel 34 again. Thus, a fifth fluid connection is available, formed by the conduit 54, the conduit 141, the conduit 74, and the outlet 78, which extends from the third storage vessel to the first storage vessel. In fact, the conduit 74 forms a sixth fluid connection extending from the first recirculation system 44 to the first storage vessel 4.

The apparatus is, in this embodiment too, provided with a third fluid connection between the first storage vessel 4 and a first outlet 36 of the at least one outlet for dispensing cooled mineral water from the first storage vessel 4. The third fluid connection is formed by conduit 38 in which, in this case, pump 40 and filter 42 are included. Outlet 68 is connected via a fourth fluid connection with the third storage vessel 34 for dispensing mineral water from the third storage vessel 34. The fourth fluid connection is formed by conduit 69. The apparatus is, as stated, also provided with a fifth fluid connection between the third storage vessel 34 and the first storage vessel 4 for conveying mineral water from the third storage vessel 34 back to the first storage vessel 4. The fifth fluid connection is, in this case, formed by conduit 54, conduit 141, conduit 74 and outlet 78. In this case, too, the second recirculation system 80 may be used to discharge mineral water from the first storage vessel 4 and to subsequently supply the discharged mineral water to the first storage vessel 4 again In fact, from the second recirculation system 80 the water can flow via valve 122 into he first recirculation system. In other words, as stated before, the first recirculation system is connected with the second recirculation system. Via conduit 74 and outlet 78, the water can then arrive in the first storage vessel 4 again. The embodiment of the apparatus shown in FIG. 4 may be provided with a conduit 150 and a valve 152 included therein, which extends between the third storage vessel 84 and the first storage vessel 4 or, as in the example shown, extends from the third storage vessel 34 to the conduit 74 between the valve 120 and the first storage vessel 4. Via conduit 160 and via conduit 74, it is possible to allow mains water to flow from the inlet 2 to the first storage vessel 4. This may take place, for instance, when starting up the apparatus. When using conduit 74 when the valve 120 is open, the mains water flows from the inlet 2 via conduit 140 to the first recirculation system 80 to subsequently arrive via pump 58 and conduit 141 through the then open valve 120 in the conduit 74. When using conduit 160, the mains water flows from the inlet 2 via conduit 140 to the first recirculation system 80 to subsequently arrive via pump 58, conduit 141, and recirculation outlet 50 in the third storage vessel 34. From the third storage vessel 34, the mains water flows via conduit 160 with the valve 152 then open therein into conduit 74 and subsequently arrives in the first storage vessel. Functionally, in such a situation the conduits 150 and 74 also farm part of the first fluid connection with, in fact, extends from the inlet 2 to the first storage vessel 4. This situation may also occur when, during use, the level of the water in the first storage vessel 4 is very low as a result of, for instance, excessive use of the apparatus, repair, leaning, etc. In normal use, too, it is possible that mains water arrives via conduits 74 and/or 150 in the first storage vessel, although the mains water will then be mixed with, for instance, mineral water flowing in the first recirculation system 44.

The conduits 74 and 150 are also useful for supply of mineral water to the first storage vessel, for instance in a situation in which no mains water is supplied to the apparatus via the inlet 2 and the position of the float 126 ill the first storage vessel indicates that water must be supplied to the first storage vessel. In this case, the valve 152 of the conduit 150, too, will be controlled by means of the control unit 24 on the basis of the position of float 125.

As stated before, it is of course possible that conduit 150 does not discharge into conduit 74 but discharges directly into the first storage vessel 4. Conduit 150 may functionally also form part of the second recirculation system, which second recirculation system is therefore connected with the first recirculation system. The other characteristics of the embodiment shown in FIGS. 1, 2 and 3 also apply to the embodiment shown in FIG. 4.

The embodiment shown in FIG. 4, after starting up, operates as follows. When mineral water is taken from the apparatus, or instance by allowing an amount of mineral water to flow from outlet 68, the float 125 provided with a switch will detect this taking. The switch 125 also communicates with the control unit 24 which opens the tap 2a on the basis of this detection. The mains water flows via non-return valve 129 through the dirt filter 10a to the RO filter 10. The waste water from the RO filter is discharged via conduit 112 and conduit 110. The filtered water arrives via conduit 140 in the first recirculation system 44. It holds that via the conduit 140 mains water is supplied to the first recirculation system which is then filled with mineral water. This means that the first fluid connection, in this embodiment, also extends from the outlet 2 to at least the first recirculation system. When it is detected that mineral water has been taken from the third storage vessel 34, the filtered water will, in the first instance, arrive in the third storage vessel 34 via a recirculation outlet 58. Pump 58 provides the required pressure. When the switch 125 in the third storage vessel 34 has reached a desired level, the tap 2a is closed again.

After a predetermined amount of water has optionally been measured continuously by the flow or volume meter 121, the control unit 24 ensures that the valve or tap 122 opens. The mineral water coming from the first storage vessel 4 is then admixed to the water flowing through the first recirculation system 44. A part of the water flowing through the first reaction system can flow to the first storage vessel by opening the valve 120. Also, by opening the valve 152, water can flow from the third storage vessel to the first storage vessel. Thus, via the first and the second recirculation system, the water can be properly mixed so that the concentration of the minerals in the water becomes equal everywhere. If this concentration is too low, minerals can be supplied from the second storage vessel 16 to the respective water by means of the dosing unit 18. After mixing, the concentration of all the water will rise to the desired level It will be clear that the supply of minerals to the first storage vessel is also understood to mean the supply of minerals to other points in the apparatus from where the water can flow to the first storage vessel 4. One example thereof is the addition of the minerals to, or instance, the first fluid connection, the first recirculation system 44, the second recirculation system 80 or the third storage vessel 34.

Preferably, all the fluid connections with the third storage vessel extend from the housing 65 through the support 70. Thus, all the fluid connections are invisible to the user.

The cooling of the mineral water in the first storage vessel 4 can, for instance, be regulated on the basis of the position of the float 126 and/or a temperature measurement of that water. Such regulations are adjustable by those skilled in the art in a simple manner.

The circulation of the water in the first recirculation system 44 can take place on the basis of the position of the float 125 in the third storage vessel 34. Thus, for instance, the pump 58 can be put into operation when the float 125 has reached the lower position. These regulations, too, are adjustable by those skilled in the art in a simple manner.

The invention may be arranged such that when an amount of water predetermined by the meter 121 is not measured per prolonged time unit of, for instance, a day, the water from the water tank 100 is pumped away and fresh mains water is supplied to the water processing means from the mains water inlet 2. In the embodiment shown in FIG. 4, too, it holds that each fluid connection extending from the housing to the third storage vessel or the first outlet is shielded from vision, and it hold that the first storage vessel, the second storage vessel, the cooling unit, and the dosing unit are shielded from vision. A user will therefore always have the impression that water is taken from the third storage vessel, even though water is taken from the first storage vessel.

The invention is in no way limited to the above-described embodiments. Thus, the first, second, third, fourth, fifth, and sixth fluid connections may also be formed by other systems of conduits. Also, one of the outlets 36 or 38 may be omitted so that only cooled or only uncooled water can be taken. Moreover, both outlets may be combined to one outlet. For cooling, each known per se cooler can be used. In the embodiment of FIG. 1, the first recirculation system and the second recirculation system may be cold with each other by opening the valve 79. If the first and the second recirculation stem are in use, all the water in the apparatus can thus be properly mixed so that a homogeneous concentration can be obtained. The water in the third storage vessel can then also be cooled by water coming from the first storage vessel. This also applies to the embodiment of FIG. 4 when the valve 120 and/or the valve 152 is open. The apparatus will then further be provided with one or two valves for optionally supplying mineral water from the first storage vessel 4 or from the second storage vessel 34 to the respective one outlet. This option may, for instance, be made by a consumer by means of an electronic switch, after which, by opening the one outlet, mineral water is dispensed from the first or the third storage vessel. The apparatus may further be provided with, for instance, an opto-coupler 110, with which it can be detected whether there is a second storage vessel 16 which is coupled with the dosing device 18. The second storage vessel 16 may, for instance, be of interchangeable design. The second storage vessel 16, however, need not often be interchanged because it can be provided with sufficient minerals for preparing hundreds of liters of mineral water. The apparatus may further be provided with conductivity meters, for instance in vessel 4, to control the quality of the cold water system or after filter 10 to control the operation of the filtering device. Thus, the filter 42 may also be included in the conduit 46, that is to say in the first recirculation system. Also, besides the filter 42 in the conduit 38, a filter may also be included in the first recirculation system. In that case, the first and the second recirculation system each comprise a filter. These filters may be of the tape as mentioned in the present application, but also other known per se filters suitable for filtering water are useful. These filters may each be provided with, for instance, a microfilter, such as a capillary membrane, a ceramic filter, a carbon filter, etc. for, for instance, removing undesirable constituents from water, such as algae, microbes, aromatic substances, flavorings, and the like. The apparatus may also be used to prepare fruit juice which may be realized by mixing the mineral water and a concentrate of fruit juice. It is possible that the concentrate is put into a beaker separately before the mineral water is added. It is also conceivable that near the first outlet and the second outlet a provision is made for dissolving in the mineral water a fruit juice concentrate or separately dispensing a fruit juice concentrate. The apparatus is, in use, preferably washed so often by activation of the pumps that the growth of microorganisms is practically completely avoided.

Also, if desired, the second recirculation system may be omitted. In that case, it is also possible that no stirrer needs to be used in the first storage vessel when minerals are used that rapidly and easily dissolve in water. Such variants are each deemed to fall within the scope of the invention.

The invention claimed is:

1. An apparatus for presenting and dispensing mineral water suitable for consumption, wherein the apparatus is arranged to generate the mineral water from supply water and is provided with a supply water inlet, a first storage vessel which, in use, is filled with the mineral water, at least a first fluid connection between the inlet and the first storage vessel and, optionally, a filter which is included in the first fluid connection for filtering supply water which, in use, flows from the inlet via the first fluid connection to the first storage vessel, at least a second storage vessel which, in use, is filled with minerals, at least a dosing unit for dispensing, in a dosed manner, minerals from the second storage vessel to the first storage vessel, at least a cooling unit for cooling the first storage vessel, at least a third storage vessel which, in use, is also filled with the mineral water, a second fluid connection between the first storage vessel and the third storage vessel for conveying mineral water from the first storage vessel to the third storage vessel and at least an outlet for dispensing mineral water from the third storage vessel and/or the first storage vessel, the apparatus—further being provided with at least a first recirculation system for discharging mineral water from the third storage vessel and for then supplying the discharged mineral water to the third storage vessel again.

2. An apparatus according to claim 1, wherein the first fluid connection comprises a conduit extending from the inlet to the first storage vessel.

3. An apparatus according to claim 1 wherein the first fluid connection is provided with a conduit extending from the inlet to the first recirculation system and a conduit extending from the first recirculation system to the first storage vessel.

4. An apparatus according to claim 1, wherein the second fluid connection at least partly extends through at least a part of the first recirculation system.

5. An apparatus according to claim 1, wherein the apparatus is further provided with at least a second recirculation system for discharging mineral water from the first storage vessel and for then supplying the discharged mineral water to the first storage vessel again.

6. An apparatus according to claim 5, wherein that the second fluid connection extends through at least a part of the second recirculation system.

7. An apparatus according to claim 1, wherein a wall of the third storage vessel is of at least partly made of transparent materials.

8. An apparatus according to claim 1, wherein a first recirculation system is provided with a recirculation outlet from where, in use, the mineral water squirts against an inner side of the wall of the third storage vessel.

9. An apparatus according to claim 8, whereby, in use, the mineral water from the recirculation outlet squirts against a transparent part of the wall of the third storage vessel.

10. An apparatus according to claim 9, wherein the apparatus is further provided with a housing in which the first storage vessel, the second storage vessel, the cooling unit and the dosing unit are included, at least a part of the transparent part of the wall of the third storage vessel being situated outside the housing.

11. An apparatus according to claim 10, wherein an upper side of the third storage vessel is spherical, at least part of the upper side of the third storage vessel is transparent.

12. An apparatus according to claim 9 whereby, in use, the mineral water squirts from the recirculation outlet upward in vertical direction.

13. An apparatus according to claim 11, wherein the wall of the whole third storage vessel is of transparent design and that the whole storage vessel is placed outside the housing.

14. An apparatus according to claim 1, wherein the apparatus is further provided with a third fluid connection between the first storage vessel and a first outlet of the at least one outlet for dispensing cooled mineral water from the first storage vessel.

15. An apparatus according to claim 14, wherein a second outlet of the at least one outlet is connected via a fourth fluid connection with the third storage vessel for dispensing mineral water from the third storage vessel.

16. An apparatus according to claim 15, wherein the first outlet and the second outlet are placed near each other such that from both outlets mineral water can be supplied to a container such as a beaker or cup without displacing the container.

17. An apparatus according to claim 15, wherein the first and the second outlet are placed below the third storage vessel so that it appears as though the water flowing out of the first outlet comes from the third storage vessel.

18. An apparatus according to claim 17, wherein the third storage vessel hangs above a platform of the housing by means of a support, the third fluid connection extending from the housing through the support to the second outlet and thus being invisible to the user.

19. An apparatus according to claim 1, wherein the apparatus is further provided with a fifth fluid connection between the third storage vessel and the first storage vessel for conveying mineral water from the third storage vessel back to the first storage vessel.

20. An apparatus according to claim 1, wherein the filter is arranged to remove sediment, dirt, rust, aromatic substances, minerals, salts and/or flavorings from the mains water.

21. An apparatus according to claim 1, wherein at least one filter is included in the second recirculation system.

22. An apparatus according to claim 14, wherein the apparatus is further provided with a first pump for conveying the mineral water through the second and the third fluid connection.

23. An apparatus according to claim 1, wherein the apparatus is further provided with a second pump which is included in the first recirculation system.

24. An apparatus according to claim 1, wherein the first storage vessel is further provided with an overflow for discharging mineral water from the first storage vessel when the level of the mineral water in the first storage vessel exceeds a first predetermined value.

25. An apparatus according to claim 1, wherein the third storage vessel is provided with an overflow for discharging mineral water from the third storage vessel when the level of the mineral water in the third storage vessel exceeds a second predetermined value.

26. An apparatus according to claim 1, wherein the apparatus is provided with a control unit for controlling the cooling unit, the dosing device and the liquid flows through the fluid connections.

27. An apparatus according to claim 26, wherein the control unit is arranged to dispense dosed portions of mineral water from the third storage vessel.

28. An apparatus according to claim 26, wherein the control unit is arranged to dispense dosed portions of mineral water from the first storage vessel.

29. An apparatus according to claim 1, wherein the first recirculation system includes at least one filter.

30. An apparatus according to claim 21, wherein the filter is provided with a microfilter, such as a capillary membrane, a ceramic filter or a carbon filter.

31. An apparatus according to claim 18, wherein each fluid connection from the housing with the third storage vessel or the outlet extends through the support so that said each fluid connection cannot be seen by a user.

32. An apparatus according to claim 10, wherein each fluid connection extending from the housing to the third storage vessel or the outlet is shielded from vision.

33. An apparatus according to claim 10, wherein the first storage vessel, the second storage vessel, the cooling unit and the dosing unit are shielded from vision.

34. An apparatus according to claim 1, wherein the apparatus is provided with a sixth fluid connection extending from the first recirculation system to the first storage vessel.

35. An apparatus according to claim 29, wherein the filter is provided with a microfilter.

\* \* \* \* \*

UNITED STATES PATENT AND TRADEMARK OFFICE
CERTIFICATE OF CORRECTION

| | |
|---|---|
| PATENT NO. | : 7,318,893 B2 |
| APPLICATION NO. | : 10/867097 |
| DATED | : January 15, 2008 |
| INVENTOR(S) | : Biesheuvel et al. |

It is certified that error appears in the above-identified patent and that said Letters Patent is hereby corrected as shown below:

Title Page Please add the following Foreign Application Priority Data under item (30):

--December 12, 2001 (NL) 1019544
December 12, 2002 PCT/NL02/000824--

Signed and Sealed this

Twenty-fourth Day of June, 2008

JON W. DUDAS
*Director of the United States Patent and Trademark Office*